Aug. 9, 1932.    B. NASH    1,871,078
COLOR MATCHING APPARATUS
Filed Sept. 26, 1930    2 Sheets-Sheet 1
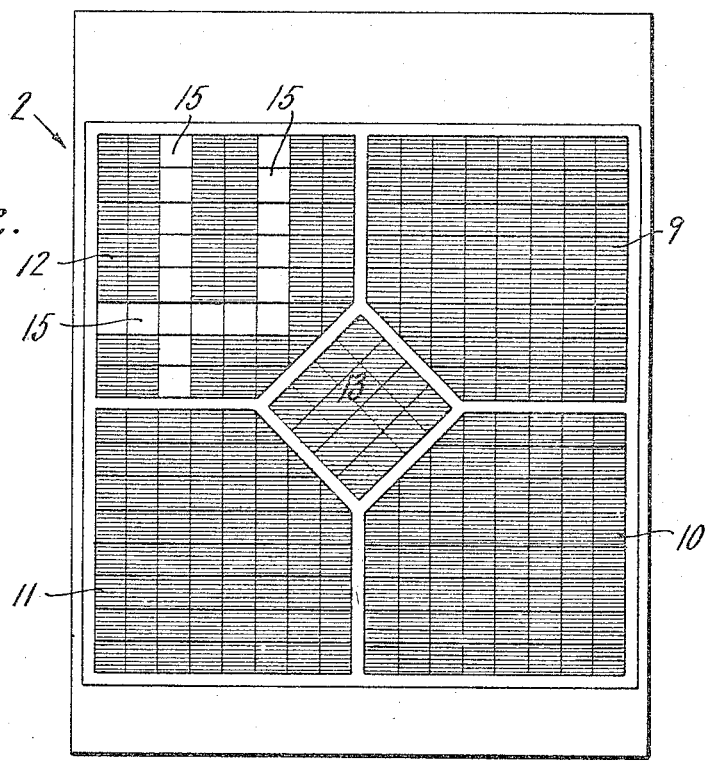
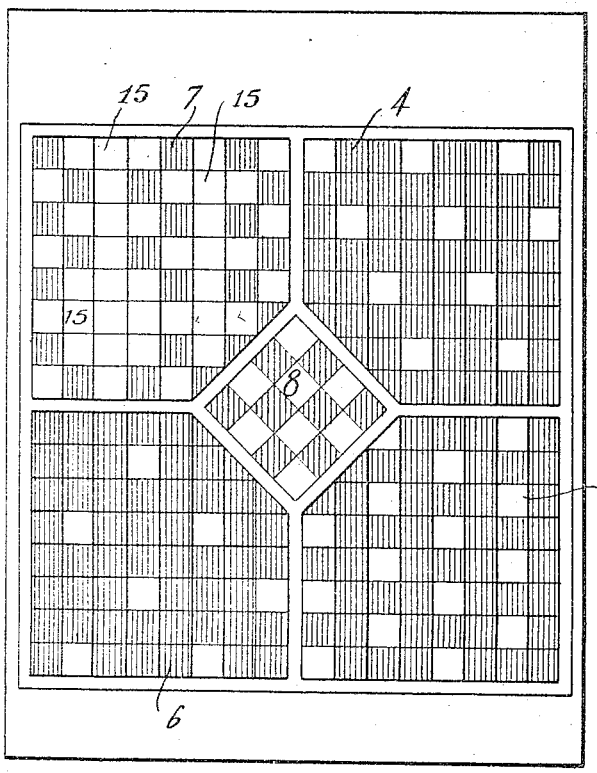
INVENTOR
*Ben Nash*
BY
ATTORNEY

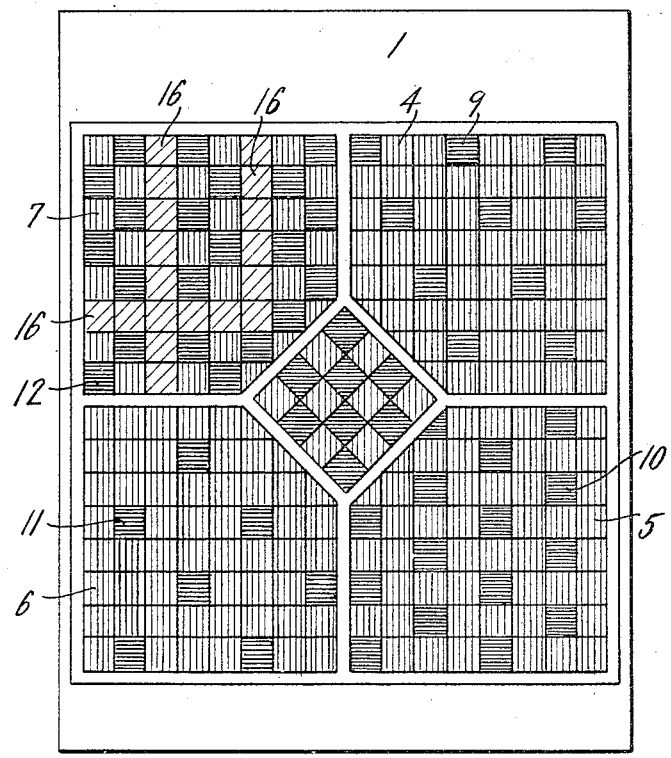

Patented Aug. 9, 1932

1,871,078

UNITED STATES PATENT OFFICE

BEN NASH, OF SHORT HILLS, NEW JERSEY, ASSIGNOR TO REVERE RUBBER COMPANY, OF PROVIDENCE, RHODE ISLAND, A CORPORATION OF RHODE ISLAND

COLOR MATCHING APPARATUS

Application filed September 26, 1930. Serial No. 484,695.

My invention relates to color matching apparatus, and more particularly to color matching apparatus for simultaneously showing a series of areas, each of which is composed of an unstandardized color whereby the illuminating qualities of different proportions of various combined colors are given.

In preparing color schemes for many purposes it is desired to have a mottled, unstandardized or variegated effect. This is particularly true of materials used for interior decorations, an example of which is floor tiling. In order to avoid the expense and trouble of making up samples of many colored materials and afterwards cutting and matching them to study various color combinations, I provide color matching apparatus which simultaneously gives a plurality of color effects of different proportions.

I provide a plurality of charts which are subdivided into substantially similar sections. One of the charts is given a predominating color. Transparent areas are dispersed in different proportions throughout the several sections. By superimposing the first chart on a second chart having a different predominating color on substantially a solid background it is possible simultaneously to secure the visual effects of a plurality of fields having different proportions of the two predominating colors. If desired the second chart may be provided with transparent sections so that still another colored background may be compared with the color backgrounds on the first mentioned charts.

The accompanying drawings illustrate a present preferred embodiment of my invention, in which Figure 1 is a face view of one color chart;

Fig. 2 is a similar view of another color chart; and

Fig. 3 is a view showing the first chart superimposed on the second chart with a background of a third color.

Referring to the drawings, my color matching apparatus comprises a plurality of charts 1 and 2, each of which is of substantially the same shape and is divided into a plurality of sections or subdivisions 4, 5, 6, 7 and 8; and 9, 10, 11, 12 and 13, respectively. In the charts of Figs. 1 and 2 sections 4 and 9; 5 and 10; 6 and 11; 7 and 12; and 8 and 13 are of similar shape and equal area. In chart 1 the predominating color in the several sections is broken by the interposition of a plurality of transparent areas 15 indicated in white. The ratio of predominating color to transparent area in section 4 is 5 to 1; in section 5 it is 3 to 1; in section 6, 7 to 1; and section 8, 1 to 1. Section 7 is for special color combinations and the ratio is approximately 2 to 5, although the areas of the predominating color are irregularly positioned for purposes hereinafter set forth. It is to be understood that the mathematical values given are by way of illustration and are not limitations of the invention as it is obvious that other mechanical ratios could be used to produce the same result.

One method of making the charts is to take a sheet of transparent celluloid and print the several colors over the rear face, omitting the color from certain of the areas to provide the transparent areas. The process of printing on celluloid has been fully developed, and accordingly a detailed discussion thereof is omitted from the present application.

By having the colors on the lower face of the chart, the reflective values of the different colors may be compared since all the reflected light is transmitted through the transparent material of the chart.

In chart 2 the sections 9, 10, 11 and 13 are printed solid without any open or transparent areas. Accordingly, when the chart 1 is transposed over chart 2, a plurality of color fields utilizing the predominating colors of the two charts in different proportions are simultaneously observable in sections 4, 5, 6 and 8 of chart 1. This gives a desired comparison of different quantities of the predominating colors of the charts. It is to be understood that such predominating color fields may be a standard color, an unstandardized color, a variegated color or combinations thereof, and may serve to represent the actual colors of various materials, such as rubber, stone, fabric and the like.

One application of the present invention is that of determining color combinations for floor tiling, and particularly rubber floor tiling. By preparing either or both of charts 1 and 2 so that the color background accurately produces the illuminating qualities of different materials, an example of which is rubber floor tiling, the composite effect of different types of flooring when used in different proportions can be accurately determined without resorting to the actual preparation of samples of the finished material.

In section 12 of chart 2 there are a number of transparent areas 15 which are roughly in the shape of a figure four. When the two charts are superimposed, the transparent areas 15 of chart 2 are in alignment with transparent areas 15 in section 5 of chart 1. By placing a third color background, as shown by the shaded area 16 in Fig. 3, behind the charts 1 and 2 various combinations of predominating colors of charts 1 and 2 with other predominating colors may be studied without disturbing the composite color combinations of the other sections of the assembled charts.

While I have shown and described two examples of different charts which may be superimposed, it is to be understood that the apparatus may be expanded to include a large number of charts having different predominating colors, but all of which may be interchangeably used in the manner herein described.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A color matching chart comprising a sheet having a plurality of sections of a uniform predominating color or color combination arranged for simultaneous inspection, said sections having transparent areas dispersed throughout the predominant color in different proportions, whereby upon the superimposition of said chart upon a background of a different color or color combination a plurality of different color effects are produced simultaneously with said predominating color or color combination.

2. A color matching chart comprising a sheet having a plurality of sections of a uniform predominating color or color combination arranged for simultaneous inspection, said sections having transparent areas dispersed throughout the predominant color, the proportion of the transparent area to the colored area in each section being definitely fixed and differing from the proportions in the other sections, whereby upon the superimposition of said chart upon a background of a different color or color combination a plurality of different color effects of known color ratios are produced simultaneously with said predominating color or color combination.

3. Color matching apparatus comprising a plurality of charts, each of which is divided into similar sections arranged for simultaneous inspection and has a uniform predominating color or color combination, the sections of one of said charts having transparent areas dispersed throughout the predominant color, the proportion of the transparent area to the colored area in each section being definitely fixed and differing from the proportions in the other sections, another chart having sections of substantially a solid predominating color or color combination and at least one section having transparent areas at least some of which are similarly placed to transparent areas in the first named chart, whereby upon the superimposition of the first mentioned chart upon the second mentioned chart and both are superimposed upon a background of a different color or color combination, a plurality of different color affects are produced simultaneously with the predominating color or color combination of the first named chart in known ratios.

4. Color matching apparatus comprising a plurality of charts, one of which is divided into a plurality of sections arranged for simultaneous inspection and has a uniform predominating color or color combination, said sections having transparent areas dispersed throughout the predominating color, the proportion of the transparent area to the colored area in each section being definitely fixed and differing from the proportions in the other sections, and another chart having substantially a solid predominating color or color combination, whereby upon the superimposition of the first mentioned chart upon the second mentioned chart, a plurality of different color effects simultaneously are produced with the predominating color or color combination of the first named chart in known ratios.

Signed at Providence, county of Providence, State of Rhode Island, this 19th day of September, 1930.

BEN NASH.